US012605921B2

(12) United States Patent
Maier et al.

(10) Patent No.: US 12,605,921 B2
(45) Date of Patent: Apr. 21, 2026

(54) FILM PACKAGING HAVING CAVITIES AND BEING ORIENTED IN THE DIRECTION OF MOVEMENT OF THE MACHINE

(71) Applicant: RKW SE, Mannheim (DE)

(72) Inventors: Leonhard Maier, Babensham (DE); Adrien Dembowski, Mannheim (DE); Claudia Spicker, Mannheim (DE); Luc Hermans, Mannheim (DE); Frederic Wypelier, Mannheim (DE); Konrad Noniewicz, Mannheim (DE); Thomas Stroh, Mannheim (DE); Claudia Bender, Mannheim (DE)

(73) Assignee: RKW SE, Mannheim (DE)

( * ) Notice: Subject to any disclaimer, the term of this patent is extended or adjusted under 35 U.S.C. 154(b) by 32 days.

(21) Appl. No.: 18/840,603

(22) PCT Filed: Feb. 17, 2023

(86) PCT No.: PCT/EP2023/054012
§ 371 (c)(1),
(2) Date: Aug. 22, 2024

(87) PCT Pub. No.: WO2023/161142
PCT Pub. Date: Aug. 31, 2023

(65) Prior Publication Data
US 2025/0162300 A1 May 22, 2025

(30) Foreign Application Priority Data

Feb. 22, 2022 (EP) ..................................... 22157932
Jul. 4, 2022 (DE) .......................... 102022116670.8

(51) Int. Cl.
*B32B 27/20* (2006.01)
*B32B 7/02* (2019.01)
(Continued)

(52) U.S. Cl.
CPC .............. *B32B 27/205* (2013.01); *B32B 7/02* (2013.01); *B32B 27/08* (2013.01); *B32B 27/32* (2013.01);
(Continued)

(58) Field of Classification Search
CPC ......... B32B 27/205; B32B 7/02; B32B 27/08; B32B 27/32; B32B 2250/24;
(Continued)

(56) References Cited

U.S. PATENT DOCUMENTS 6,117,464 A * 9/2000 Moore ...................... B32B 7/06
426/127
7,569,279 B2 8/2009 Longmoore
(Continued)

FOREIGN PATENT DOCUMENTS

| DE | 60208583 | 3/2006 |
| EP | 3786220 A1 | 3/2021 |
(Continued)

OTHER PUBLICATIONS

Braskem Datasheet (Year: 2024).*
INEOS Olefins & Polymers USA (Year: 2025).*

*Primary Examiner* — Betelhem Shewareged
(74) *Attorney, Agent, or Firm* — Volpe Koenig

(57) ABSTRACT

A recyclable, cold-sealing packaging having at least a first film and a cold-sealing compound and a print. The film is formed from a largely unmixed polyolefin, is stretched monoaxially in the machine direction and has at least two layers. At least one layer has an inorganic filler to create cavities in the layer.

23 Claims, 2 Drawing Sheets

(51) Int. Cl.
B32B 27/08 (2006.01)
B32B 27/32 (2006.01)

(52) U.S. Cl.
CPC ....... *B32B 2250/24* (2013.01); *B32B 2307/41* (2013.01); *B32B 2307/54* (2013.01); *B32B 2307/72* (2013.01); *B32B 2307/7242* (2013.01); *B32B 2307/734* (2013.01); *B32B 2307/7376* (2023.05)

(58) Field of Classification Search
CPC ............ B32B 2307/41; B32B 2307/54; B32B 2307/72; B32B 2307/7242; B32B 2307/734; B32B 2307/7376
USPC ...................................................... 428/195.1
See application file for complete search history.

(56) References Cited

U.S. PATENT DOCUMENTS

| | | | |
|---|---|---|---|
| 2003/0068473 A1* | 4/2003 | Okumura ................. | B41M 5/52 |
| | | | 428/195.1 |
| 2006/0024518 A1 | 2/2006 | Kong et al. | |
| 2011/0039043 A1* | 2/2011 | Klemann .............. | B41M 5/502 |
| | | | 428/32.37 |

FOREIGN PATENT DOCUMENTS

| | | |
|---|---|---|
| WO | 2014154507 A1 | 10/2014 |
| WO | 2020098947 A1 | 5/2020 |
| WO | 2020131709 A2 | 6/2020 |
| WO | 2021156304 A1 | 8/2021 |

* cited by examiner

FILM PACKAGING HAVING CAVITIES AND BEING ORIENTED IN THE DIRECTION OF MOVEMENT OF THE MACHINE

CROSS-REFERENCE TO RELATED APPLICATIONS

This application is a 371 National Phase of PCT/EP2023/054012, filed Feb. 17, 2023, which claims priority from German Patent Application No. 10 2022 116 670.8, filed Jul. 4, 2022, and European Patent Application No. 22157932.9, filed Feb. 22, 2022, all of which are incorporated herein by reference as fully set forth.

TECHNICAL FIELD

The invention relates to a recyclable, cold sealing packaging with at least one first film and a cold sealing compound and a print, wherein the film is formed from a substantially unmixed polyolefin, is stretched monoaxially in the machine direction and has at least two layers.

BACKGROUND

Packaging is important for the protection of products and/or the shelf life of food. There is a wide range of different types of packaging, from paper packaging, glass and metal packaging to composite packaging and plastic packaging.

The properties of low mass, resistance and durability favor plastics as a packaging material for food. In particular, polyethylene (PE) and polypropylene (PP) based packaging has proven to be ecologically advantageous, as it can be recycled particularly well.

Packaging is usually understood to be a multi-layered and one-piece arrangement of partly different films that can be produced by extrusion. The term laminate refers to the joining of a film and another film to form a packaging unit. A print or printed image can be arranged between the films.

At the same time, the way in which plastic packaging is currently produced and disposed of can also be harmful to the environment under certain circumstances. The consequences range from high $CO_2$ emissions to pollution of the oceans. To counteract this, the European Union wants to reduce the landfilling of plastic waste as part of its Green Deal. By 2030, 55% of plastic packaging waste is to be recycled.

The term "mechanical recycling" refers to the processing of plastic waste into secondary raw materials or products in which the chemical compounds of the plastics are not broken down. The waste is mechanically shredded and melted by an extruder. Plastic granulate is then produced again in the same process. This form of recycling is particularly suitable for waste streams of a type of relatively clean plastic.

Of course, there are also challenges for recycling. The plastic streams consist of a "mix" of materials, often with a high degree of contamination. The effort involved in collecting, sorting, washing and recycling causes high costs and results in a raw material of limited quality. This makes it commercially unattractive to use the recycled raw materials from these streams in new products.

The focus will therefore also be on more sustainable product design, such as the construction of more mono-materials, better separation at source and further technical developments around automatic sorting and decoloring, which will make the mechanical recycling of these waste streams more attractive.

Now that many European countries have signed the European Plastics Pact, this could improve soon. According to this pact, all packaging and single-use plastics must be designed in such a way that they are reusable or recyclable by 2025.

The term "cold sealing" refers to the sealing of plastic packaging at ambient temperature, usually at 15-26° C., as opposed to a high temperature sealing polymer, which seals when exposed to heat and pressure. Due to their ability to form seals without heat, cold sealing compounds are ideal for packaging heat-sensitive products such as ice cream, baked goods and confectionery. In addition, cold sealing self-adhesives enable faster packaging speeds than the heat sealing method.

Cold sealable compositions are adhesives that are not tacky to the touch after application and drying on a substrate, but which adhere to each other when pressed together at room temperature. Due to their non-sticky properties, coated substrates can be rolled onto rolls and stored until use, without adhesion to the opposite, preferably release-coated, side of the carrier substrate. Typically, polymer dispersions based on natural rubber latex are used for cold sealing adhesives.

WO 2014/154507 A1 describes the use of a polymer dispersion for cold sealing, wherein the polymer dispersion contains a polymer dispersed in water with a glass transition temperature in the range from −20 to +10° C., which can be prepared by emulsion polymerization of monomers which can be polymerized by free radicals in the presence of at least one polymeric protective colloid and wherein the polymer is formed to 0.05 to less than 1% by weight from a monomer M selected from the group consisting of (meth)acrylate monomers having a substituent of the formula where X is CH2, O, NH or NR and R is a $C_1$ to $C_4$ alkyl group.

U.S. Pat. No. 7,569,279 B2 discloses a packaging film having a cold sealing release liner comprising a cold sealing release layer for releasably engaging a cold sealing adhesive, the packaging film having a cold sealing receiving layer opposing the cold sealing release layer, the cold sealing receiving layer retaining the cold sealing adhesive thereon, the cold sealing adhesive retained on the receiving layer being releasably engageable with the cold sealing release layer. The cold sealing release layer contains a silicone oil lubricant and is oxidatively treated.

DE 602 08 583 T3 describes a polyolefin multilayer film having a polyolefin core layer and a first polyolefin top layer adjacent to the core layer which provides a cold sealing accepting surface for a cold sealing adhesive, wherein the first polyolefin top layer does not contain any thermoplastic or natural rubber. The first polyolefin topcoat comprises a blend of an ethylene-propylene random copolymer in an amount of 50-90% by weight of the topcoat and a metallocene catalyzed plastomer in an amount of 10-50% by weight of the topcoat.

WO 2020/098947 A1 discloses a recyclable, easily tearable packaging laminate with a good barrier effect and low density, with a first laminate layer and a second laminate layer. The first laminate layer is a co-extruded and stretched composite of a cavitated substrate layer with 5-30% by weight cavitating agent and with a PE content of at least 60% by weight, a bonding layer and a barrier layer of a barrier polymer.

SUMMARY

The object of the present invention is to provide packaging that meets the requirements of the Plastics Pact 2025 and is fully recyclable. The packaging should also be suitable for packaging foodstuffs. In addition, it should be possible to make the packaging very rigid and opaque. The packaging should not shrink. The packaging should be harmless to health and ecologically sustainable. In addition, the packaging should not emit any odors. The packaging should also have a pleasant feel.

According to the invention, this object is ensured by a recyclable, cold sealing packaging, a method and two uses according to the subsidiary main claims. Given variants can be found in the subclaims, the description, the embodiment example and the drawings.

According to the invention, at least one layer has an inorganic filler for creating cavities in the layer.

In abstract terms, a cavity is an empty or gas-filled space inside something solid. The space is therefore surrounded by a solid boundary that separates the space from the outside. In the case of a polymer film, the space is delimited from the outside by polymeric material.

Preferably, one cavity and/or a plurality of cavities and/or all cavities of the layer can be in the form of vacuoles.

These cavities or vacuoles are formed by the inorganic, solid filler, which leads to the formation of these cavities by monoaxial stretching after extrusion. This gives the film and/or packaging an advantageous opacity.

Opacity is the opposite of transparency. It is a measure of opacity or opacity in percent. In particular, the opacity of a completely opaque film is 100% and a completely or fully transparent film has an opacity of 0%.

In a particularly favorable variant, the film has an opacity according to DIN 53416 of more than 80%, preferably more than 90%, in particular more than 95%. This means that the film can be printed directly and does not require an opaque layer under the print, which must first be created or applied.

In an extremely advantageous embodiment of the invention, the film for packaging products and/or foodstuffs does not have titanium dioxide to produce opacity. This embodiment meets the requirements of environmental and health protection to a particularly high degree.

The film, which is virtually free of titanium dioxide, therefore complies with the European chemicals regulation REACH and the amendment to the CLP regulation. The film can therefore be described as free from harmful substances.

In a particularly favorable variant of the invention, the filled layer is formed as an inner layer. The inner layer is preferably surrounded by two unfilled layers. This creates a three-layer film in the most minimalist variant.

Surrounding the filled layer with unfilled layers ensures that the cavities are enclosed and sealed off from the outside. This ensures that no cavity has a direct and/or indirect connection to the outside.

In further variants of the invention, the filled layer can be surrounded by several unfilled layers, whereby a symmetrical film structure is preferably realized. This means that the filled layer is surrounded on both sides by the same number of unfilled layers. This preferably results in a five-layer or a seven-layer or a nine-layer film.

Hard and inorganic fillers are particularly suitable for the film according to the invention. The proportion of fillers is calculated in such a way that only microporous cavities are created by stretching, which do not have a network of connections between them.

The filler content can be determined using known measurement methods such as ashing. A sample with a known weight is heated to a temperature at which the polymer thermally decomposes but the filler does not. For example, 560° C. has proven to be a good temperature for this. The sample weight is then measured again. The polymer content per square meter can be calculated using the difference between the weighed out and weighed in weight.

As an alternative to ashing, a TGA measurement is possible in which the weight of a sample is measured continuously during heating. This test method can also clearly differentiate between polymer and filler and allows the polymer content of the film to be determined.

In one variant of the invention, calcium carbonate ($CaCO_3$) is used as a filler, preferably with an average particle size of less than 6.5 $\mu$m. During the stretching process, the elastic polymer components of the filled layer are stretched and cavities are formed in the layer. In a variant of the invention, the proportion of calcium carbonate is more than 40% by weight, preferably more than 50% by weight, in particular more than 60% by weight and/or less than 90% by weight, preferably less than 80% by weight, in particular less than 70% by weight.

In addition to or as an alternative to calcium carbonate ($CaCO_3$), a metal oxide component can be used as a filler. Alkaline earth oxides are particularly advantageous as metal oxide components, both as a filler to ensure the formation of pores in the layer and at the same time as an adhesive to ensure the adhesion of the printed image. Calcium oxide (CaO) has proven to be particularly advantageous, although the use of magnesium oxide is also conceivable.

Talc and/or titanium dioxide and/or dolomite have also proven to be particularly effective as fillers.

In a particularly advantageous variant of the invention, a cold sealing compound is arranged on the film. This is preferably applied to the film using a web-fed rotary printing process. As a result, the film can be sealed to form a package in a packaging system at the producer of, for example, ice cream, baked goods and/or confectionery.

Ideally, the cold sealing compound is applied directly to the film. This means that no further intermediate layers and/or adhesive layers are required.

In a favorable variant of the invention, the cold sealing compound is applied and arranged evenly on the film. Evenly can mean that the entire film has a layer of a cold sealing compound. In addition, partial areas and/or geometric patterns, preferably depending on the packaging shape and design, can also be applied to the film using cold sealing compound.

Preferably, the cold sealing compound consists of a material base of natural latex. In addition, synthetically produced cold sealing compounds are also included within the scope of the invention.

The cold sealing compound may also contain functional additives such as fillers, pigments, anti-blocking agents, slip agents and stabilizers. However, it is useful to keep this surface as additive-free as possible to reduce any reduction in adhesion to cold sealing self-adhesive compounds. As a rule antiblocking agents are used in this layer to ensure excellent processability and roll formation. Examples of anti-blocking agents are amorphous silicon oxide, particles of cross-linked synthetic silicone, particles of cross-linked polymethyl methacrylate, silicate-based anti-blocking agents and other commercially available anti-blocking agents.

In an alternative variant of the invention, the film is formed into a package with a further film. In this case, the further film is joined to the further film after a print has been applied.

In an alternative variant of the invention, the film has at least one additional layer of EVOH and/or PA. This additional layer can be designed as an outer layer, to which the print adheres better. At the same time, this additional outer layer improves the heat resistance of the film. For this purpose, the additional layer of EVOH and/or PA is particularly thin, so that the proportion of material in the overall film is particularly low and the film is considered a mono-material construction in terms of recycling.

In order to realize the recyclability and thus also the sorting in modern waste separation plants, such as the float-sink process, the density of the film is less than 0.99 g/cm$^3$, preferably less than 0.95 g/cm$^3$, in particular less than 0.90 g/cm$^3$ and/or more than 0.60 g/cm$^3$, preferably more than 0.70 g/cm$^3$, in particular more than 0.80 g/cm$^3$. This is achieved in particular by the monoaxial stretching of the film and the formation of cavities in the filled layer.

Advantageously, the formation as well as the inclusion of cavities in a middle layer leads to a density of the film that is safely below 1.00 g/cm$^3$.

In a particularly favorable variant of the invention, the polyolefin is a polyethylene. Polyethylene (PE) is a thermo-plastic produced by chain polymerization of petrochemically produced ethene. Polyethylene is semi-crystalline and non-polar.

Ideally, the polyolefin is exclusively polyethylene. This means that the film meets the requirements of the Plastics Pact, is based on a mono-material construction and is recyclable.

The thickness of the film was measured in accordance with DIN 53370 and specified as an average value. After stretching in the monoaxial direction, the film has a thickness of less than 40 μm, preferably less than 35 μm, in particular less than 30 μm and/or more than 5 μm preferably more than 10 μm in particular more than 15 μm. This clearly distinguishes the film according to the invention from already known filled polyolefin films (FPO), the thickness of which is usually more than 100 μm.

Ideally, the film is particularly thin and saves material. The design of the film therefore corresponds to the design specifications from the plastic package. Nevertheless, due to the special manufacturing process, the film has outstanding properties that make it an ideal film, especially for food.

In an advantageous variant of the invention, the film has a gas permeability of less than 500 cm$^3$/m$^2$·d·bar, preferably of less than 300 cm$^3$/m$^2$·d·bar, in particular of less than 1003 cm/m$^2$·d·bar according to DIN EN ISO 2556. DIN EN ISO 2556:2000 is the German version for determining the gas permeability of films and thin sheets under atmospheric pressure using the pressure gauge method (ISO 2556:1974).

Films and sheets with a thickness of up to 1 mm are tested using strip or shoulder samples. According to ISO 527-3 and ASTM D 882, the usual specimen shape is the strip. This sample shape can be produced easily using a cutting press or a film cutter. Shoulder samples are often used in quality control. In this case, a direct measuring extensometer is required, with which the sample elongations can be recorded directly on the sample. Typical test results such as the yield stress, the elongation at yield, the maximum stress and the nominal elongation at break are recorded.

The tensile properties are determined in accordance with DIN EN ISO 527. In the tensile test, a test strip of a film is stretched at a constant speed specified in the test standard and the force F is recorded with the change in length A L of the measuring section $L_o$.

In film packaging applications, the linear-elastic and linear-viscoelastic load ranges usually play a role. It is precisely in these slight deformation ranges, for example at 2% of the secant modulus, that films are frequently subjected to stress. In an advantageous variant of the invention, the film has a tensile stiffness at 2% secant modulus according to DIN EN ISO 527-3 of more than 500 MPa, preferably of more than 550 MPa, in particular of more than 600 MPa.

Ideally, the film has a tensile strength in the machine direction according to DIN EN ISO 527-3 of more than 90 MPa, preferably more than 100 MPa, in particular more than 110 MPa. This makes the film particularly stiff and tough, which also enables the application of a high-quality printed image.

Shrinkage or shrinkage of plastics refers to a change in the dimensional stability of test specimens at temperatures $T>T_G$ (amorphous) or $T>T_S$ (semi-crystalline), which is caused by the resetting of molecular orientations and the relaxation of residual stresses. The orientations arise as a result of the manufacturing process (extrusion, injection molding or deep drawing) and are therefore dependent on processing parameters. These parameters are the temperature of the tool and the melt, the injection and holding pressure, the flow path length and the cooling gradient of the film.

In a favorable variant of the invention, the film has a shrinkage according to DIN 55543-4 of less than 4%, preferably less than 3%, in particular less than 2%.

The Dart Drop Test, also known as the Falling Dart Impact Test, Drop Hammer Method or Free Falling Dart Method according to DIN EN ISO 7765-1, is a traditional method for evaluating the impact resistance or toughness of a plastic film. A drop hammer with a variable weight and a diameter of 28 mm is dropped from a height of 0.66 m onto a wrinkle-free and firmly clamped film with a thickness of 0.04 mm in a standard climate. The weight of the drop hammer at which the film is penetrated in 50% of the drop tests is determined.

For example, the film has a dart drop according to DIN EN ISO 7765-1 of more than 95 g, preferably more than 115 g, in particular more than 135 g.

Optionally, the dynamic puncture energy according to DIN EN ISO 7765-2 is more than 10 J/mm, preferably more than 12 J/mm, in particular more than 14 J/mm.

In a favorable variant of the invention, the multilayer structure of the film is symmetrical, whereby the printability of both outer layers can be realized.

The special properties of the film are achieved through the use and selection of special polymers.

Ideally, the outer, unfilled layer of the film has a mixture of two polyethylenes of different densities, with the higher density polyethylene having a density of more than 0.94 g/cm$^3$ and the lower density polyethylene having a density of less than 0.94 g/cm$^3$.

Advantageously, the proportion of the higher density polyethylene in the mixture is more than 10% by weight, preferably more than 20% by weight, in particular more than 25% by weight and/or less than 50% by weight, preferably less than 40% by weight, in particular less than 35% by weight. The proportion of higher density polyethylene gives the film excellent rigidity and heat resistance.

In a particularly favorable variant of the invention, the proportion of the low-density polyethylene in the mixture is more than 50% by weight, preferably more than 60% by weight, in particular more than 65% by weight and/or less than 90% by weight, preferably less than 80% by weight, in particular less than 75% by weight. The proportion of low-density polyethylene ensures a favorable toughness of the film.

Ideally, the higher density polyethylene is made of an HDPE whose density is more than 0.942 g/cm³, preferably more than 0.944 g/cm³ and/or less than 0.96 g/cm³, preferably less than 0.95 g/cm³.

Preferably, the low-density polyethylene is made of an MDPE whose density is more than 0.91 g/cm³, preferably more than 0.92 g/cm³ and/or less than 0.95 g/cm³, preferably less than 0.94 g/cm³.

In variants of the inventions which have more than three layers, one or more intermediate layers are arranged between the filled layer and the unfilled outermost layer. These intermediate layers are preferably unfilled and consist of an MDPE whose density is more than 0.91 g/cm³, preferably more than 0.92 g/cm³ and/or less than 0.95 g/cm³, preferably less than 0.94 g/cm³.

The flow behavior of polyolefins is described using the melt index MI (Melt Index) according to ASTM 1238, usually at a temperature of 190° C. for polyethylene and 230° C. for polypropylene at a load of 2.16 kg, 5 kg or 21.6 kg. A higher melt flow index correlates with a lower average molecular weight of the polymer. At the same time, the higher the melt index of a polymer, the lower the melt viscosity, which is advantageous for a high output of the extrusion system. On the other hand, polymers with a high molecular weight, i.e. a low melt index, are advantageous in terms of mechanical stability, in particular tensile strength and toughness.

Ideally, the HDPE has a melt index MI of more than 1.0 g/10 min, preferably more than 1.25 g/10 min, in particular more than 1.5 g/10 min and/or less than 3.0 g/10 min, preferably less than 2.0 g/10 min, in particular 1.75 g/10 min at 190° C. and 5 kg. Furthermore, the melt flow index is more than 11 g/10 min, preferably more than 13 g/10 min, in particular more than 15 g/10 min and/or less than 30 g/10 min, preferably less than 20 g/10 min, in particular less than 17 g/10 min at 190° C. and 21.6 kg.

Preferably, the HDPE has a medium molecular weight and a particularly narrow molecular weight distribution, which leads to good bubble stability and processability. Furthermore, the layers with HDPE have excellent tensile strength and good elongation at break with a low tendency to fibrillation.

Advantageously, the MDPE has a melt flow index MI of more than 1.0 g/10 min, preferably more than 1.5 g/10 min, in particular more than 1.9 g/10 min and/or less than 4.0 g/10 min, preferably less than 3.0 g/10 min, in particular less than 2.1 g/10 min at 190° C. and 5 kg. Furthermore, the melt flow index is more than 20 g/10 min, preferably more than 30 g/10 min, in particular more than 40 g/10 min and/or less than 65 g/10 min, preferably less than 55 g/10 min, in particular less than 45 g/10 min at 190° C. and 21.6 kg. As a result, the layers with MDPE as well as the film achieve a high toughness and simultaneously high stiffness values.

In a particularly useful variant, the film comprises more than one intermediate layer, preferably more than two intermediate layers, which are all made of the same MDPE. This special multi-layer construction gives the film a particularly high toughness and rigidity, while at the same time preventing the formation of fibrils in a particularly advantageous way.

Ideally, the filled layer has a mixture of different polymers in addition to the filler, whereby the mixture comprises a proportion of LDPE, a proportion of MDPE and a proportion of HDPE.

In a particularly favorable variant of the invention, the proportion of LDPE in the mixture of the filled layer is more than 6% by weight, preferably more than 10% by weight, in particular more than 14% by weight and/or less than 24% by weight, preferably less than 20% by weight, in particular less than 16% by weight.

Advantageously, the proportion of MDPE in the mixture of the filled layer is more than 7% by weight, preferably more than 12% by weight, in particular more than 17% by weight and/or less than 30% by weight, preferably less than 25% by weight, in particular less than 20% by weight.

Preferably, the proportion of HDPE in the mixture of the filled layer is more than 4% by weight, preferably more than 7% by weight, in particular more than 10% by weight and/or less than 20% by weight, preferably less than 17% by weight, in particular less than 14% by weight.

In principle, five-layer and seven-layer films are also included within the scope of the invention, whereby the mechanical properties can be improved with an increasing number of layers.

Preferably, the print is arranged directly on an outer layer of the film. The print or imprint can be arranged on the side facing away from the packaged goods or as a counterprint between the film and possibly another film. The print can also be designed as a print motif. In the area of film, the term print motif refers to the thematic design part of an imprint. If necessary, manufacturer-identifying print motifs can also be included in the scope of the print.

Preferably, the print is applied to an outer layer of the film using a flexographic printing process, whereby all conventional printing processes are in principle suitable for this purpose and are expressly included in the invention.

The special selection of polymers as well as the design in a three- to nine-layer variant produce a particularly thin film that nevertheless has impressive mechanical properties, even in the design of a mono-material construction. Despite the thin design, the stiffness and simultaneous toughness, which are realized in particular by the polyethylene mixture in at least one outer layer, lead to excellent printability. The filled layer with cavities in particular results in an opaque film that is ideal for printing.

According to the invention, the method for manufacturing a package comprises several steps. First, a mixture of the polymer components is made, which is then extruded to form a film with at least two layers. The polymer mixtures differ with respect to the filled and unfilled layers of the film, wherein the polymer mixture of the filled layer comprises an inorganic filler to create cavities. Advantageously, the film is stretched monoaxially in the machine direction, whereby the favorable properties of the PE film are achieved. Among other things, this is an advantageous opacity, so that the film can be provided directly with a print.

Preferably, a cold sealing compound is applied to the inside of the film after and/or before and/or simultaneously with the printing process using a rotary roller process. For this purpose, the cold sealing compound can preferably be applied directly to the outer layer of the film over a large area.

The film is produced by monoaxial stretching with a machine direction orientation (MDO) by heating the polymer film to a temperature slightly below its melting point and stretching it in a specific orientation. Stretching can also take place directly after extrusion, where the film is still at a temperature slightly below its melting point.

The MDO stretched and oriented film makes it possible to package food and/or objects based on a particularly thin film as well as a uniform, single material structure. MDO stretching achieves properties of the PE film that were previously only known from multi-material constructions or from PP and PET films.

In an advantageous variant of the invention, the film is stretched by more than a factor of three, preferably more than a factor of four, in particular more than a factor of five. This gives the film an advantageous stiffness and a favorable opacity.

In a particularly advantageous variant, the opaque, printed film is joined to another film to form packaging, in particular a packaging laminate. In principle, all common and known joining methods are suitable for this.

The other film is preferably also based on a monomaterial construction made of polyethylene.

In a particularly advantageous variant of the invention, the further film is a nine-layer film, preferably based on MDPE, which is also stretched monoaxially in the machine direction.

In a favorable embodiment of the further film, at least one outer layer has a higher density than the at least one inner layer. The outer layer comprises a mixture of at least two polyethylenes of different densities, wherein the polyethylene of higher density has a density of more than $0.94$ g/cm$^3$ and the polyethylene of lower density has a density of less than $0.94$ g/cm$^3$.

Ideally, the density of the higher density polyethylene is greater than the lower density polyethylene by a factor, the value of the factor being more than 1.002, preferably more than 1.005, in particular more than 1.008 and/or less than 1.20, preferably less than 1.15, in particular less than 1.10.

Preferably, the inner layer is made of an MDPE whose density is more than $0.91$ g/cm$^3$, preferably more than $0.92$ g/cm$^3$ and/or less than $0.95$ g/cm$^3$, preferably less than $0.94$ g/cm$^3$ and/or whose melt flow rate (at 190° C. at 2.16 kg) according to ASTM D 1238 is more than 0.1 g/10 min, preferably more than 1.0 g/10 min and/or less than 5.0 g/10 min, preferably less than 3.0 g/10 min.

In a particularly useful variant, the polyethylene film comprises more than one inner layer, preferably more than two inner layers, in particular more than four inner layers, all of which are formed from the same MDPE. This special multi-layer construction gives the polyethylene film a particularly high degree of toughness and rigidity, while at the same time preventing the formation of fibrils in a particularly advantageous manner.

Ideally, the higher density polyethylene of the further film in the outer layer is formed from an HDPE whose density is more than $0.942$ g/cm$^3$, preferably more than $0.944$ g/cm$^3$ and/or less than $0.96$ g/cm$^3$, preferably less than $0.95$ g/cm$^3$ and/or whose melt flow rate (at 190° C. at 2.16 kg) according to ASTM D 1238 is more than 5 g/10 min, preferably more than 10 g/10 min and/or less than 25 g/10 min, preferably less than 20 g/10 min.

Advantageously, the low-density polyethylene of the outer layer of the further film is formed from an MDPE whose density is more than $0.91$ g/cm$^3$, preferably more than $0.92$ g/cm$^3$ and/or less than $0.95$ g/cm$^3$, preferably less than $0.94$ g/cm$^3$ and/or whose melt flow rate (at 190° C. at 2.16 kg) according to ASTM D 1238 is more than 0.1 g/10 min, preferably more than 1.0 g/10 min and/or is less than 5.0 g/10 min, preferably less than 3.0 g/10 min.

In a particularly simple embodiment of the additional film, the film comprises three layers. The inner layer is preferably made of an MDPE, while the two outer layers are made of a polymer mixture of HDPE and MDPE.

In a particularly advantageous variant of the invention, the further film comprises a nine-layer structure. Preferably, three equally thin inner layers of MDPE form the core of the additional film, each of which is surrounded by an inner intermediate layer. Ideally, the inner intermediate layers are also made of MDPE and are approximately twice as thick as the inner layers. An outer intermediate layer is arranged between the inner intermediate layer and the outer layer. The outer intermediate layer is slightly thicker than the inner intermediate layer and preferably consists of a mixture of higher and lower density polyethylene. The outer layer has a thickness that is again slightly thicker than the thickness of the outer intermediate layer and also consists of a mixture of higher and lower density polyethylene, whereby the outer layer also has a small proportion of additives.

In a particularly favorable variant of the additional film, the thickness of the layers increases from the inner layer to the outer layer. This applies from the three-layer to the nine-layer film. This version of the additional film achieves particularly advantageous mechanical properties and thus creates a film that can be printed to a high quality.

In addition, the further film is ideally monoaxially stretched in the machine direction by more than a factor of 2.0, preferably by more than a factor of 3.0, in particular by more than a factor of 4.0, and/or is stretched by less than a factor of 7.0, preferably by less than a factor of 6.5, in particular by less than a factor of 6.0.

Advantageously, the further film has a thickness of less than 60 μm, preferably less than 50 μm, in particular less than 40 μm and/or more than 5 μm, preferably more than 10 μm, in particular more than 15 μm.

The film according to the invention is used as recyclable and unmixed cold sealing packaging for foodstuffs. The film has the advantages of a mono-material construction, achieves and surpasses many features of multi-component constructions and fulfills the requirements of the European Union's Plastics Pact.

According to the invention, the film is combined with another film to form packaging. The combined films are used as recyclable, unmixed packaging for foodstuffs.

BRIEF DESCRIPTION OF THE DRAWINGS

Further advantages and features of the invention are apparent from the description of an embodiment example with reference to drawings and from the drawings themselves.

Shown are

DETAILED DESCRIPTION

Figure 1:
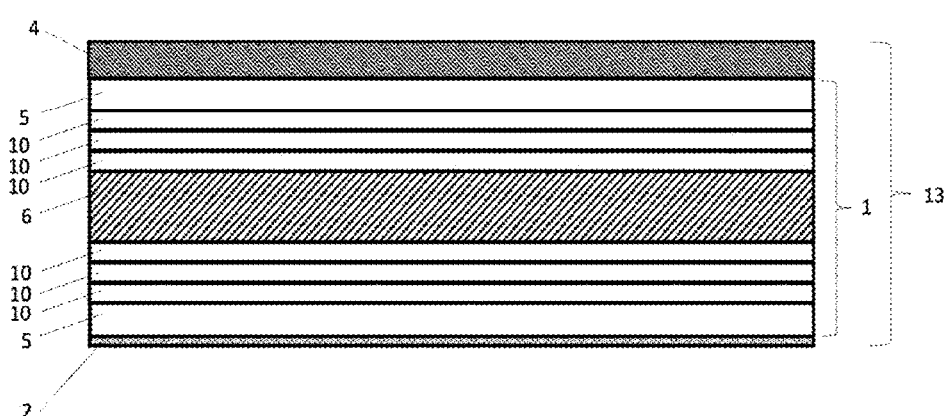
FIG. 1 a schematic representation of the film according to the invention with a cold sealing compound, FIG. 2 a schematic representation of the film with additional layer, FIG. 3 a schematic representation of the packaging according to the invention with a cold sealing compound, FIG. 4 a further variant of the packaging according to the invention.

FIG. 1 shows a schematic representation of the packaging 13 according to the invention in the embodiment of the film 1 with a cold sealing compound 2 and the print 4. In the embodiment shown, the film 1 has a nine-layer structure.

Layer 6 is the filled layer, whereby the proportion of CaCO$_3$ is approx. 55% by weight. Furthermore, layer 6 has a proportion of LDPE of approx. 15% by weight, a proportion of MDPE of approx. 18% by weight and a proportion of HDPE of approx. 12% by weight.

The layers 5 form the outer layers of the film 1, whereby the layers 5 have no fillers. In layer 5, the proportion of MDPE is approx. 70% by weight and the proportion of HDPE is 30% by weight. The HDPE is made, for example, from a Hostalen ACP 7740 F3, whose density is 0.946 g/cm$^3$ and whose melt flow rate (at 190° C. at 5 kg) is 1.6 g/10 min according to ISO 1133.

Three further thin layers 10 are arranged between the filled layer 6 and the unfilled layers 5. Layer 10 is formed entirely from an MDPE, for example a *Borealis* Borshape FX1002, whose density is 0.937 g/cm$^3$ and whose melt flow rate (at 190° C. at 5 kg) is 2 g/10 min in accordance with ISO 1133.

First Example

After blow extrusion, the film 1 has a thickness of 119 μm. After monoaxial stretching by a factor of 4.82, the thickness of film 1 is 24.7 μm, with a density of 0.92 g/cm$^3$.

Second Example

After blow extrusion, the film 1 has a thickness of 147 μm. After monoaxial stretching by a factor of 5.74, the thickness of film 1 is 40 μm, with a density of 0.86 g/cm$^3$.

The film 1 has a tensile stiffness of more than 632 MPa at 2% secant modulus and a tensile strength in the machine direction according to DIN EN ISO 527-3 of more than 119.3 MPa. Furthermore, the shrinkage of film 1 according to DIN 55543-4 is less than 2.1%, while the opacity according to DIN EN ISO 2813 is more than 95%. Film 1 has a dart drop of 135.4 g according to DIN EN ISO 7765-1.

Figure 2:
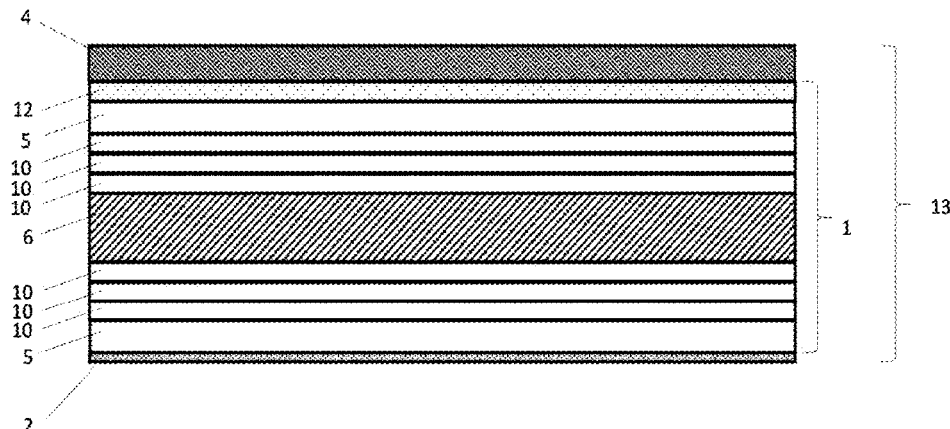

FIG. 2 shows a schematic representation of the packaging 13 according to the invention in the form of film 1 with an additional layer 12. The film 1 essentially corresponds to the embodiments in FIG. 1, whereby in this embodiment an additional layer 12 of EVOH is arranged between the print 4 and the layer 5.

Figure 3:
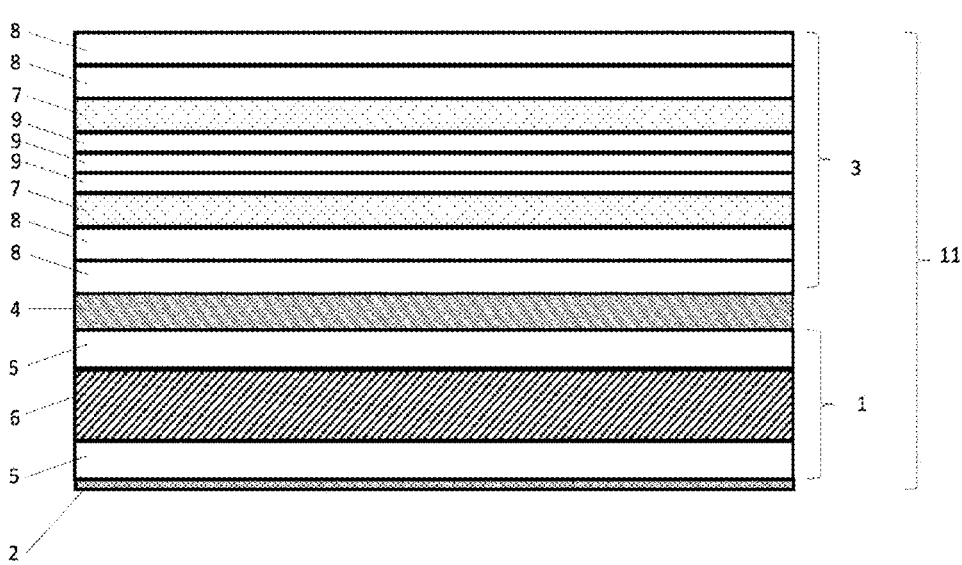

FIG. 3 shows a schematic representation of the packaging 11 according to the invention with a cold sealing compound 2. The packaging 11 is formed from the film 1 and the further film 3.

A print 4 is positioned between the other film 3 and the film 1, which is printed onto the opaque film 1 before it is joined. The print 4 is used to identify the food to be packaged and to visually recognize and support the brand image of the food brand.

In this embodiment, the other film 3 is formed with nine layers in a symmetrical structure. The five innermost layers 7 and 9 consist entirely of an MDPE, for example a *Borealis* Borshape FX1002, whereby the three innermost layers 9 are significantly thinner than the two surrounding layers 7.

In addition to the MDPE, the two outer layers 8 of the other film 3 each have a proportion of HDPE. In the embodiment shown, the proportion of HDPE is 85% by weight and is made, for example, from a Hostalen ACP 7740 F3.

First Example

The nine-layer, additional film 3 has a thickness of 139 μm after blow extrusion. After monoaxial stretching by a factor of 5.95, the thickness of the additional film 3 is 25 μm, with a density of 0.905 g/cm$^3$.

Second Example

After blow extrusion, the film 1 has a thickness of 147 μm. After monoaxial stretching by a factor of 5.74, the thickness of film 1 is 40 μm, with a density of 0.86 g/cm$^3$.

In the embodiment shown in FIG. 3, the film 1 has a three-layer structure. Layer 6 is the filled layer, whereby the proportion of CaCO$_3$ is approx. 55% by weight. Furthermore, layer 6 has a proportion of LDPE of approx. 15% by weight, a proportion of MDPE of approx. 18% by weight and a proportion of HDPE of approx. 12% by weight.

The filled layer 6 is each surrounded by a layer 5, whereby the unfilled layer 5 has no fillers. In layer 5, the proportion of MDPE is approx. 70% by weight and the proportion of HDPE is 30% by weight.

After blow extrusion, the film 1 has a thickness of 140 μm. After monoaxial stretching by a factor of 4.82, the thickness of film 1 is 29 μm, with a density of 0.87 g/cm$^3$.

Figure 4:
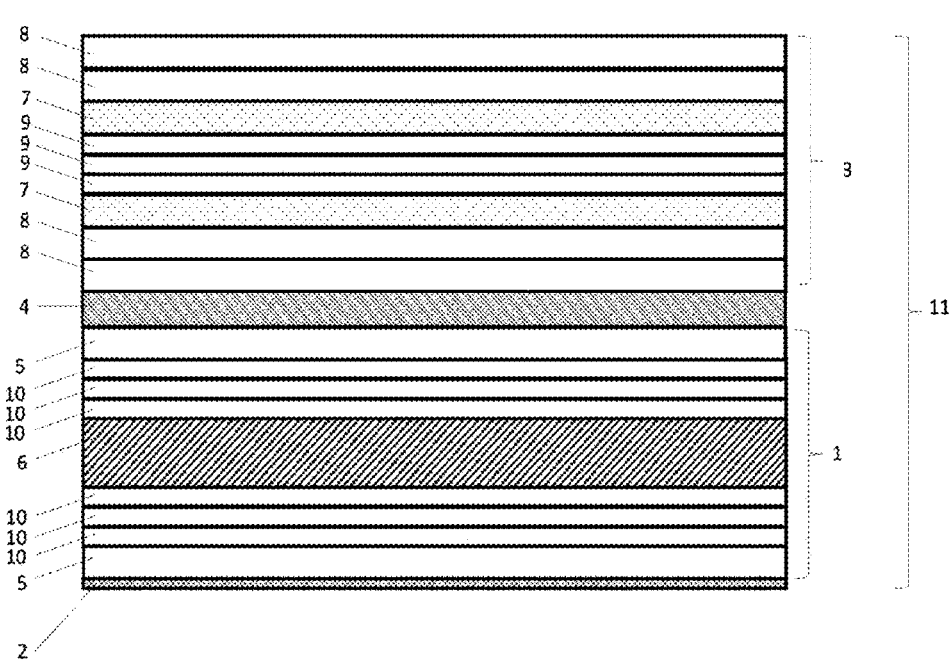

The embodiment of the packaging 11 shown in FIG. 4 essentially corresponds to the embodiment in FIG. 3. Only the film 1 has a nine-layer structure as already described in detail in FIG. 1.

The invention claimed is:

1. A recyclable, cold-sealing packaging (11, 13), comprising:

a first film (1) having at least two layers (5, 6), a cold-sealing compound (2), and a print (4) arranged adjacent to the first film (1), the first film (1) being formed from a substantially unmixed polyolefin and being stretched monoaxially in a machine direction, at least one of the at least two layers (5,6) comprising an inorganic filler for creating cavities in the layer, and the inorganic filler and the monoaxial stretching in the machine direction resulting in the first film (1) having an opacity of more than 80% according to DIN 53416.

2. The packaging according to claim 1, wherein the cold sealing compound (2) is arranged directly on the first film (1).

3. The packaging according to claim 1, wherein the cold sealing compound (2) is arranged evenly on the first film (1).

4. The packaging according to claim 1, wherein the at least one layer (6) with the inorganic filler is formed as an inner layer, the inner layer being surrounded by two unfilled ones of the layers (5).

5. The packaging according to claim 1, wherein a density of the first film (1) is less than 0.99 g/cm$^3$ and is more than 0.60 g/cm$^3$.

6. The packaging according to claim 1, wherein the polyolefin is a polyethylene.

7. The packaging according to claim 1, wherein the filler is CaCO$_3$ and has a particle size of less than 6.5 μm.

8. The packaging according to claim 1, wherein a proportion of the filler in the layer (6) is more than 5% by weight and less than 60% by weight.

9. The packaging according to claim 1, wherein the first film (1) has a thickness of less than 40 μm and more than 5 μm.

10. The packaging according to claim 1, wherein the first film (1) has a gas permeability of less than 500 cm$^3$/m$^2$ d bar according to DIN EN ISO 2556.

11. The packaging according to claim 1, wherein the first film (1) has a tensile stiffness at 2% secant modulus according to DIN EN ISO 527-3 of more than 500 MPa.

12. The packaging according to claim 1, wherein the first film (1) has a tensile strength in the machine direction according to DIN EN ISO 527-3 of more than 90 MPa.

13. The packaging according to claim 1, wherein the first film (1) has a shrinkage according to DIN 55543-4 of less than 4%.

14. The packaging according to claim 1, wherein the first film (1) further comprises a layer (12) of ethylene-vinyl alcohol copolymer layer (EVOH) or polyamide (PA).

15. The packaging according to claim 1, further comprising at least one further film (3), the at least one further film (3) having at least two layers of polyethylene of different density and being stretched in the machine direction.

16. The packaging according to claim 1, wherein the first film (1) has a dart drop according to DIN EN ISO 7765-1 of more than 95 g.

17. A method for manufacturing the package according to claim 1 comprising the following steps:
producing different compositions,
extruding the film (1) having at least two layers (5, 6),
printing on the film (1),
stretching the film (1) monoaxially in the machine direction.

18. The method according to claim 17, wherein the extruding is carried out as a blow extrusion.

19. The method according to claim 17, wherein the film (1) is stretched by more than a factor of 3.

20. The method according to claim 17, wherein the film (1) is joined to at least one further film (3) to form the package.

21. The method according to claim 17, further comprising applying a cold sealing compound (2) to the film (1).

22. The method of claim 19, further comprising the film being a recyclable, unmixed cold sealing packaging (13).

23. The method of claim 19, further comprising laminating a further film (3) to the film, and using the film as recyclable, unmixed packaging (11).

* * * * *